United States Patent Office 3,306,726
Patented Feb. 28, 1967

3,306,726
METHOD FOR THE CONTROL OF WEEDS
Jordan P. Berliner and Sidney B. Richter, both of Chicago, Ill., assignors to Velsicol Chemical Corporation, Chicago, Ill., a corporation of Illinois
No Drawing. Filed Dec. 20, 1965, Ser. No. 515,167
9 Claims. (Cl. 71—2.6)

This application is a continuation-in-part of our co-pending application Serial No. 300,195, filed August 6, 1963, now abandoned.

This invention relates to the production of pesticidal compositions of matter. More specifically, this invention relates to the control of weeds with chemical compounds of the general formula

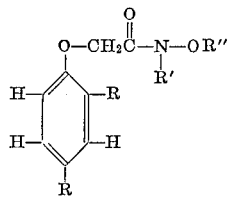

wherein R″ is selected from the group consisting of unsubstituted lower alkyl and unsubstituted lower alkenyl, each R and R′ are selected from the group consisting of hydrogen, unsubstituted lower alkyl and unsubstituted lower alkenyl provided that a maximum of one of the R substituents is hydrogen. By lower alkyl and lower alkenyl are meant those groups which contain up to six carbon atoms.

The compounds in the method of this invention can be prepared conveniently by the reaction of the appropriate acyl halides as described, for example, in United States Patent 3,027,407, granted March 27, 1962, having the general formula

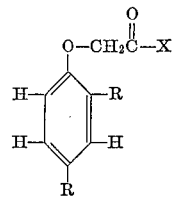

with amines HNR′(OR″) wherein R, R′ and R″ are as defined above and X is chlorine or bromine. At least equimolecular proportions of the acyl halide and the amine should be used, and the reaction is preferably carried out in a relatively inert solvent such as benzene. It is also desirable to employ a basic condensing agent such as sodium or potassium carbonate to facilitate the reaction, which will frequently take place at ordinary room temperature. The reaction mixture can also be heated, and temperatures up to about the normal reflux temperature of the reaction mixture are preferred. Atmospheric pressure is ordinarily employed, but sub- or superatmospheric pressures can also be used. The reaction will normally proceed to a satisfactory degree within 5 to 10 hours. The product can be isolated by filtering off any inorganic solids which have formed and then distilling off the solvent under reduced pressure. The residue will often be sufficiently pure for incorporation into herbicidal compositions without further treatment, but if desired the pure compound can be isolated by any of the techniques known to the art, such as crystallization, fractional distillation, or chromatography.

The acyl halides suitable as starting materials are either known in the art or can be prepared readily from the corresponding carboxylic acids by reaction with halogenating agents such as thionyl chloride or phosphorous pentachloride. Some examples of typical carboxylic acids which can be used for the preparation of compounds useful in the method of this invention are o-allylphenoxyacetic acid,
(2-allyl-4-tert-butylphenoxy)acetic acid,
(o-1-butenylphenoxy)acetic acid,
(p-2-butenylphenoxy)acetic acid,
o-butylphenoxyacetic acid,
p-butylphenoxyacetic acid,
o-sec-butylphenoxyacetic acid,
o-tert-butylphenoxyacetic acid,
p-tert-butylphenoxyacetic acid,
o-ethylphenoxyacetic acid,
p-ethylphenoxyacetic acid,
p-(1-ethylpropyl)phenoxyacetic acid,
(4-ethyl-o-tolyloxy)acetic acid,
p-isopropylphenoxyacetic acid,
(p-3-methyl-2-butenylphenoxy)acetic acid,
o-propylphenoxyacetic acid,
p-propylphenoxyacetic acid,
(4-propyl-m-tolyloxy)acetic acid,
o-tolyloxyacetic acid,
p-tolyloxyacetic acid,
(2-butyl-p-tolyloxy)acetic acid,
(2-sec-butyl-p-tolyloxy)acetic acid,
(4-tert-butyl-o-tolyloxy)acetic acid, and the like. In the event that the appropriately substituted phenoxyacetic acid is not known, it can be prepared from the corresponding phenol by reaction with chloroacetic acid in basic medium.

Many of the amines HNR′(OR″) to be used as one of the reactants in preparing the compounds useful in the method of this invention are also known compounds. Typical of such amines are N-methyl-O-methylhydroxylamine,
N-methyl-O-ethylhydroxylamine,
O-methyl-N-ethylhydroxylamine,
O,N-diethylhydroxylamine,
N-ethyl-O-propylhydroxylamine,
N-ethyl-O-isopropylhydroxylamine,
N-ethyl-O-sec-butylhydroxylamine,
O,N-dipropylhydroxylamine,
O-ethyl-N-isopropylhydroxylamine,
O,N-diisopropylhydroxylamine,
O-ethyl-N-sec-butylhydroxylamine,
N-ethyl-O-butylhydroxylamine,
O,N-dibutylhydroxylamine,
O-allylhydroxylamine,
O-ethylhydroxylamine,
O-isobutylhydroxylamine,
O-methylhydroxylamine,
O-propylhydroxylamine, and the like. Other appropriately N- and O-substituted hydroxylamines can be obtained, for example, by the method of Hecker, Am. Chem. J., 50, 443–66 (1914). The amines can be used in their free state or preferably in the form of their water-soluble salts such as the hydrochlorides, hydrobromides, and sulfates.

The manner in which the compounds useful in the method of this invention can be prepared is illustrated in the following examples. All temperatures are in degrees centigrade.

EXAMPLE 1

*Preparation of o-methylphenoxyacetyl chloride*

A mixture of o-methylphenoxyacetic acid (27.4 g.; 0.17 mole), thionyl chloride (13.8 ml.; 0.19 mole), and 125 ml. benzene was stirred and refluxed for about 7 hrs. in a 300-ml., 3-neck flask fitted with a stirrer and condenser. An additional 5 ml. of thionyl chloride was added, and the mixture was stirred and refluxed for another 7 hrs. The reaction mixture was filtered, and the filtrate was dried over magnesium sulfate. The drying agent was filtered off, and the solvent and excess thionyl chloride were distilled off under reduced pressure. The residue was distilled in vacuo to give 21.2 g. (70.6% of theory) of light yellow o-methylphenoxyacetyl chloride, B.P. 62°/0.1 mm.

EXAMPLE 2

*Preparation of N-methoxy-N-methyl-2-methylphenoxyacetamide*

A 300-ml., 3-neck flask fitted with a stirrer, reflux condenser, and addition funnel was charged with potassium carbonate (14.9 g.; 0.108 mole), O,N-dimethylhydroxylamine hydrochloride (9.6 g.; 0.098 mole), and 100 ml. benzene. Water (10 ml.) was added slowly, after which o-methylphenoxyacetyl chloride (18 g.; 0.098 mole) was added slowly as the effervescence permitted. The reaction mixture was stirred and refluxed for about 7 hrs. and filtered. The filter cake was washed thrice with benzene, and the combined filtrate and washings were dried over magnesium sulfate and filtered. The benzene was distilled off under reduced pressure. The residue was distilled in vacuo to give 14.9 g. (72.4% of theory) of colorless N-methoxy-N-methyl-2-methylphenoxyacetamide, B.P. 115–118°/0.4 mm. A cut B.P. 117°/0.4 mm. was taken for analysis:

Analysis for $C_{11}H_{15}NO_3$.—Theory, percent: C, 63.16; H, 7.18; N, 6.7. Found, percent: C, 62.79; H, 7.29; N, 6.7.

EXAMPLE 3

*Preparation of 2,4-dimethylphenoxyacetyl chloride*

A mixture of 2,4-dimethylphenoxyacetic acid (32.4 g.; 0.180 mole), thionyl chloride (14.5 ml.; 0.198 mole), and 125 ml. benzene was stirred and refluxed for about 7 hrs. in a 500-ml., 3-neck flask fitted with a stirrer and condenser. The reaction mixture was dried over magnesium sulfate and filtered, and the filtrate was distilled under reduced pressure to remove the benzene and excess thionyl chloride. The residue, which began to solidify on cooling, was distilled in vacuo to give 23.6 g. (66.1% of theory) of light yellow 2,4-dimethylphenoxyacetyl chloride, B.P. 77–80°/0.4 mm.

EXAMPLE 4

*Preparation of N-methoxy-N-methyl-2,4-dimethylphenoxyacetamide*

A 300-ml., 3-neck flask fitted with a stirrer, condenser, and addition funnel was charged with potassium carbonate (13.7 g.; 0.099 mole), O,N-dimethylhydroxylamine hydrochloride (8.8 g.; 0.090 mole), and 100 ml. benzene. Water (10 ml.) was added slowly, followed by 2,4-dimethylphenoxyacetyl chloride (17.9 g.; 0.090 mole) at a rate consistent with good effervescence. The reaction mixture was stirred and refluxed for about 7 hours and filtered. The filter cake was washed thrice with benzene, and the combined filtrate and washings were dried over magnesium sulfate and filtered. The benzene was distilled off under reduced pressure. The residue was distilled in vacuo to give 14.2 g. (71.1% of theory) of colorless N-methoxy-N-methyl-2,4-dimethylphenoxyacetamide, B.P. 111–15°/0.2 mm. A cut B.P. 113°/0.2 mm. was taken for analysis.

Analysis for $C_{12}H_{17}NO_3$.—Theory, percent: C, 64.57; H, 7.62; N, 6.28. Found, percent: C, 64.26; H, 7.75; N, 6.48.

EXAMPLE 5

*Preparation of p-methylphenoxyacetyl chloride*

A mixture of p-methylphenoxyacetic acid (28 g.; 0.169 mole), thionyl chloride (13.5 ml.; 0.186 mole), and 100 ml. benzene was stirred and refluxed for about 7 hrs. in a 500-ml., 3-neck flask fitted with a stirrer and condenser. The reaction mixture was filtered, and the filtrate was dried over magnesium sulfate and again filtered. The solvent and thionyl chloride were distilled off under reduced pressure to give an orange residue, which was distilled in vacuo to yield 21.3 g. (68% of theory) of of colorless p-methylphenoxyacetyl chloride, B.P. 68–71°/0.38 mm.

EXAMPLE 6

*Preparation of N-methoxy-N-methyl-4-methylphenoxyacetamide*

A 300-ml., 3-neck flask fitted with a stirrer, condenser, and addition funnel was charged with potassium carbonate (14.9 g.; 0.108 mole), O,N-dimethylhydroxylamine hydrochloride (9.6 g.; 0.098 mole), and 100 ml. benzene. Water (10 ml.) was added slowly. p-Methylphenoxyacetyl chloride (18 g.; 0.098 mole) was then added with stirring at a rate consistent with good effervescence. The reaction mixture was stirred and refluxed for about 7 hrs. and filtered. The filter cake was washed thrice with benzene, and the combined filtrate and washings were dried over magnesium sulfate and filtered. Distillation of the benzene under reduced pressure left a white solid, which was distilled in vacuo to yield 17.7 g. (86.7% of theory) of colorless N-methoxy-N-methyl-4-methylphenoxyacetamide, B.P. 119–22°/0.35 mm., which solidified on cooling. A cut, B.P. 120°/0.35 mm., was taken for analysis:

Analysis for $C_{11}H_{15}NO_3$.—Theory, percent: C, 63.16; H, 7.18; N, 6.7. Found, percent: C, 62.92; H, 7.54; N, 6.9.

A wide variety of other compounds useful in the method of this invention can be prepared in a manner similar to that detailed above. In the following examples are given the starting materials which can be used to prepare the indicated named compounds for herbicidal use.

EXAMPLE 7 o - Ethylphenoxyacetyl chloride+O,N - dimethylhydroxylamine=N - methoxy - N - methyl - 2 - ethylphenoxyacetamide.

EXAMPLE 8 o - Isopropylphenoxyacetyl chloride+O,N - dimethylhydroxylamine=N - methoxy - N - methyl - 2 - isopropylphenoxyacetamide.

EXAMPLE 9 p - Ethylphenoxyacetyl chloride+O,N - dimethylhydroxylamine=N-methoxy - N - methyl - 4 - ethylphenoxyacetamide.

EXAMPLE 10 p - Isopropylphenoxyacetyl chloride+O,N - dimethylhydroxylamine=N - methoxy - N - methyl - 4 - isopropylphenoxyacetamide.

EXAMPLE 11 o - n - Hexylphenoxyacetyl chloride+O,N - dimethylhydroxylamine=N - methoxy - N methyl - 2 - n - hexylphenoxyacetamide.

EXAMPLE 12 o - Allylphenoxyacetyl chloride+O,N - dimethylhydroxylamine=N - methoxy - N - methyl - 2 - allylphenoxyacetamide.

EXAMPLE 13 p - Allylphenoxyacetyl chloride+O,N - dimethylhydroxylamine=N-methoxy - N - methyl - 4 - allylphenoxyacetamide.

EXAMPLE 14 o-Methylphenoxyacetyl chloride+O - methylhydroxylamine=N - methoxy - 2 - methylphenoxyacetamide.

EXAMPLE 15 o - Methylphenoxyacetyl chloride+O - isopropylhydroxylamine=N - isopropoxy - 2 - methylphenoxyacetamide.

For practical use as herbicides, the compounds in the method of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid herbicidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the weed infestation. The emulsifiers most commonly used in these concentrates are nonionic or mixtures of nonionic with anionic surface-active agents.

The herbicides in this invention can be applied in any manner recognized by the art. The concentration of the compounds in the herbicidal compositions will vary greatly with the type of formulation and the purpose for which it is designed, but generally the herbicidal compositions will comprise from about 0.05 to about 95 percent by weight of the active compounds. In a preferred embodiment of this invention, the herbicidal compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including annuals such as pigweed, lamb's-quarters, yellow foxtail, crabgrass, wild mustard, Frenchweed, ryegrass, goose grass, chickweed, and smartweed; biennials such as wild carrot, great burdock, mullein, round-leaved mallow, blue thistle, bull thistle, houndstongue, moth mullein, and purple star thistle; or perennials such as white cockle, perenial ryegrass, quackgrass, Johnson grass, Canada thistle, hedge bindweed, Bermuda grass, sheep sorrel, field chickweed, and winter-cress. Similarly, such weeds can be classified as broad-leaf or grassy weeds. It is economically desirable to control the growth of such weeds without damaging beneficial plants or livestock.

The compounds in this invention are particularly valuable for weed control because they are toxic to many species and groups of weeds while they are relatively nontoxic to many beneficial plants. While the compounds of the class useful in the method of this invention have been generically disclosed in the previously cited United States Patent 3,027,407, the art has neither taught nor suggested that these compounds have herbicidal activity. The art has shown only that these compounds are useful as anesthetics, which would not lead one to anticipate their marked toxicity to weeds and particularly their safety to crops.

The method of this invention for the control of weeds comprises contacting said weeds or the soil as a preemergence treatment with a herbicidal composition comprising an inert carrier and as the essential active ingredient, in a quantity which is herbicidally toxic to said weeds, a compound as described herein. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

Some typical herbicidal compositions which can be used in the method of this invention are shown in the following examples, in which all quantities given are in parts by weight.

EXAMPLE 16

*Preparation of an emulsifiable concentrate*

The following ingredients are blended thoroughly until a homogenous liquid concentrate is obtained. This concentrate is mixed with water to give an aqueous dispersion containing the desired concentration of active compound for use as aspray.

| | |
|---|---|
| N - methoxy - N - methyl - 2,4 - dimethylphenoxyacetamide | 25 |
| Sodium lauryl sulfate | 2 |
| Sodium lignin sulfonate | 3 |
| Kerosene | 70 |

EXAMPLE 17

*Preparation of a wettable powder*

The following components are mixed intimately in conventional mixing or blending equipment and are then ground to a powder having an average particle size of less than about 50 microns. The finished powder is dispersed in water to give the desired concentration of active compound.

| | |
|---|---|
| N - methoxy - N - methyl - 4 - methylphenoxyacetamide | 75.00 |
| Fuller's earth | 22.75 |
| Sodium lauryl sulfate | 2.00 |
| Methyl cellulose | .25 |

EXAMPLE 18

*Preparation of an oil-dispersible powder*

The following components are blended and ground as described in the previous example to give a powder which can be dispersed in oil to form a spray containing the desired concentration of active compound.

| | |
|---|---|
| N - methoxy - N - methyl - 4 - methylphenoxyacetamide | 70 |
| Condensation product of diamylphenol with ethylene oxide | 4 |
| Fuller's earth | 26 |

EXAMPLE 19

The following ingredients are mixed thoroughly and then ground to an average particle size of less than about 50 microns to give a dust suitable for application with conventional dusting equipment.

N - methoxy - N - methyl - 2 - methylphenoxyacetamide _____ 10
Talc _____ 90

EXAMPLE 20

*Preparation of a granular formluation*

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

N - methoxy - N - methyl - 2 - methylphenoxyacetamide _____ 10
Fuller's earth _____ 66
Dextrin _____ 20
Sodium lignin sulfonate _____ 3
Kerosene _____ 1

The toxicity of the compounds in this invention to weeds can be demonstrated by a variety of testing techniques known to the art. In one series of experiments, test compounds formulated as aqueous emulsions were sprayed at various dosages on the surface of soil which had been seeded less than twenty-four hours earlier with seeds of crop plants and weeds. After spraying, the soil containers were placed in the greenhouse and provided with supplementary light and heat as required and daily or more frequent watering. The type and severity of injury to each crop and weed were determined 15 and 20 days after the soil treatments. The severity of injury was rated on a 0 to 10 scale as follows: 0=no injury; 1, 2= slight injury; 3, 4=moderate injury; 5, 6=moderately severe injury; 7, 8, 9=severe injury; 10=death. In these experiments, the compound n-methoxy-n-methyl-2-methylphenoxyacetamide at a dosage equivalent to 4 lbs./acre gave the following results:

| Weed Species | Injury Rating | Type of Injury |
|---|---|---|
| Crabgrass | 8 | Stunting. |
| Downy Brome | 7 | Stunting; reduced germination. |
| Foxtail | 8 | Stunting. |
| Mustard | 8 | Do. |
| Velvet leaf | 8 | Stunting; local necrosis. |

These results were particularly significant in view of the fact that the test compound had no toxicity whatever to corn, peanuts, and wheat at dosages as high as 8 lbs./acre. The compound is therefore particularly valuable for the selective control of weeds in such commercial crops.

We claim:
1. The method for the control of weeds which comprises applying to the locus of said weeds a herbicidal composition comprising an inert carrier and as the essential active ingredient, in a quantity which is herbicidally toxic to said weeds, a compound of the formula

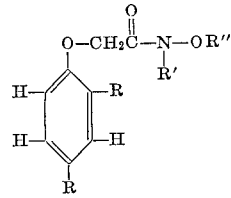

wherein R″ is selected from the group consisting of unsubstituted lower alkyl and unsubstituted lower alkenyl, each R and R′ are selected from the group consisting of hydrogen, unsubstituted lower alkyl and unsubstituted lower alkenyl provided that a maximum of one of the R substituents is hydrogen.

2. The method of claim 1 wherein the herbicidal composition is applied by contacting it with the weeds.

3. The method of claim 1 wherein the herbicidal composition is applied as a pre-emergence treatment to the soil.

4. The method of claim 1 wherein the herbicidal composition is herbicidally non-toxic to commercial crops growing in the presence of weeds.

5. The method of claim 1, wherein the compound is N-methoxy-N-methyl-2-methylphenoxyacetamide.

6. The method of claim 1, wherein the compound is N-methoxy-N-methyl-4-methylphenoxyacetamide.

7. The method of claim 1, wherein the compound is N-methoxy-N-methyl-2,4-dimethylphenoxyacetamide.

8. The method of claim 1, wherein the compound is N-methoxy-N-methyl-2-ethylphenoxyacetamide.

9. The method of claim 1, wherein the compound is N-methoxy-N-methyl-2-isopropylphenoxyacetamide.

References Cited by the Examiner

UNITED STATES PATENTS

| | | | |
|---|---|---|---|
| 2,412,510 | 12/1946 | Jones | 71—2.6 |
| 3,166,589 | 1/1965 | Richter | 71—2.6 |
| 3,166,591 | 1/1965 | Richter | 71—2.6 X |
| 3,168,561 | 2/1965 | Richter | 71—2.6 X |

ELBERT L. ROBERTS, *Primary Examiner.*

JAMES O. THOMAS, Jr., *Examiner.*

A. J. ADAMCIK, *Assistant Examiner.*